(12) United States Patent
Forthaus

(10) Patent No.: US 10,288,450 B2
(45) Date of Patent: May 14, 2019

(54) MAGNET-BASED ANGULAR DISPLACEMENT MEASURING SYSTEM

(71) Applicant: FRABA B.V., SG Heerlen (NL)

(72) Inventor: Martin Forthaus, Cologne (DE)

(73) Assignee: FRABA B.V., SG Heerlen (NL)

( * ) Notice: Subject to any disclaimer, the term of this patent is extended or adjusted under 35 U.S.C. 154(b) by 0 days.

(21) Appl. No.: 15/546,006

(22) PCT Filed: Dec. 9, 2015

(86) PCT No.: PCT/EP2015/079121
§ 371 (c)(1),
(2) Date: Jul. 25, 2017

(87) PCT Pub. No.: WO2016/119962
PCT Pub. Date: Aug. 4, 2016

(65) Prior Publication Data
US 2018/0010926 A1    Jan. 11, 2018

(30) Foreign Application Priority Data

Jan. 28, 2015 (DE) .......... 10 2015 101 248

(51) Int. Cl.
*G01D 5/14* (2006.01)
*G01D 5/244* (2006.01)
*H02K 11/215* (2016.01)

(52) U.S. Cl.
CPC ......... *G01D 5/145* (2013.01); *G01D 5/24433* (2013.01); *H02K 11/215* (2016.01)

(58) Field of Classification Search
CPC .............................. G01D 5/145; H02K 11/215

USPC ...................................................... 324/207.2
See application file for complete search history.

(56) References Cited

U.S. PATENT DOCUMENTS

| 4,409,579 A | 10/1983 | Chem |
| 6,483,296 B1 | 11/2002 | Hamaoka et al. |
| 7,368,840 B2 | 5/2008 | Terauchi et al. |
| 2001/0015642 A1 | 8/2001 | Fischer et al. |
| 2008/0164867 A1 | 7/2008 | Steinich et al. |
| 2010/0052663 A1 | 3/2010 | Mehnert et al. |
| 2011/0127997 A1 | 6/2011 | Itomi |
| 2013/0241538 A1 | 9/2013 | Akabane |
| 2014/0294625 A1* | 10/2014 | Tucker ...................... H02K 5/12 417/410.1 |
| 2015/0053040 A1* | 2/2015 | Ueda ........................ B25J 19/02 74/490.03 |

FOREIGN PATENT DOCUMENTS

| DE | 33 24 872 A1 | 1/1984 |
| DE | 38 13 610 A1 | 11/1989 |
| DE | 100 10 700 C1 | 9/2001 |

(Continued)

*Primary Examiner* — Reena Aurora
(74) *Attorney, Agent, or Firm* — Norman B. Thot

(57) ABSTRACT

A magnet-based angular displacement measuring system for measuring a rotational movement of a driveshaft. The magnet-based angular displacement measuring system includes a drive shaft comprising a free end. The free end has a coaxial recess so as to form a hollow shaft section. An exciter unit is rotationally coupled to the free end of the drive shaft. A stationary sensor unit functionally cooperates with the exciter unit to measure the rotational movement of the drive shaft.

14 Claims, 4 Drawing Sheets

(56) References Cited

FOREIGN PATENT DOCUMENTS

| | | |
|---|---|---|
| DE | 10 2007 034 099 A1 | 1/2009 |
| DE | 10 2008 051 479 A1 | 3/2010 |
| DE | 10 2009 004 780 A1 | 7/2010 |
| DE | 11 2008 002 341 T5 | 7/2010 |
| DE | 10 2009 051 978 A1 | 5/2011 |
| DE | 10 2009 051 979 A1 | 6/2011 |
| DE | 10 2012 206 898 A1 | 10/2013 |
| DE | 10 2013 103 445 A1 | 10/2014 |
| DE | 10 2013 217 428 A1 | 11/2014 |
| EP | 1 061 341 A2 | 12/2000 |
| EP | 1 128 159 A2 | 8/2001 |
| EP | 2 159 547 A2 | 3/2010 |
| EP | 2 432 103 A2 | 3/2012 |
| JP | 07134047 A | 5/1995 |
| JP | 09243401 A | 9/1997 |
| JP | 11-23213 A | 1/1999 |

\* cited by examiner

MAGNET-BASED ANGULAR DISPLACEMENT MEASURING SYSTEM

CROSS REFERENCE TO PRIOR APPLICATIONS

This application is a U.S. National Phase application under 35 U.S.C. § 371 of International Application No. PCT/EP2015/079121, filed on Dec. 9, 2015 and which claims benefit to German Patent Application No. 10 2015 101 248.0, filed on Jan. 28, 2015. The International Application was published in German on Aug. 4, 2016 as WO 2016/119962 A1 under PCT Article 21(2).

FIELD

The present invention relates to a magnet-based angular displacement measuring system for detecting a rotational movement of a drive shaft, comprising a driveshaft, an exciter unit coupled to the free or axial end of the driveshaft for rotation therewith, and a stationary sensor unit which functionally cooperates with the exciter unit for detecting the rotational movement of the driveshaft.

BACKGROUND

Angular displacement measuring systems serve to measure rotational movements of a shaft and are often also referred to as angle measuring means, angular displacement sensors, or rotary encoders. They are in particular used to control and monitor machines and vehicles. Contactless angular displacement measuring systems, for example, electrically or magnetically induced systems, here play a special role since they have a long service life due to wear-free sensor system. With magnet-based angular displacement systems, in particular with multi-turn absolute value encoders, a rotation of a shaft is inductively detected by a measuring unit, the measuring unit in particular comprising a rotating exciter unit, such as a permanent magnet, and a stationary sensor unit with at least one sensor, such as, for example, a Hall and/or a Wiegand sensor. The measuring unit is thereby mostly arranged at the free end of the shaft to be monitored.

Slight measuring errors frequently occur, however, when arranging or mounting a magnet based angular displacement measuring system directly on a drive shaft, in particular on a drive shaft of an electric motor or an electric generator. Such measuring errors are most often caused by interferences acting on the angular displacement measuring system from outside. Examples of such interference include a magnetic field caused by the drive shaft being magnetized in use by the electric motor or by an electromagnetic brake, and the magnetic field being transferred via the shaft which is typically made of steel so that, at the angular displacement measuring system, the rotational magnetic field formed by the exciter unit eventually changes, thereby causing measuring errors in the sensor unit. It is therefore necessary to avoid such interferences in the angular displacement measuring system in order to improve measuring accuracy.

DE 38 13 610 A1 describes an angle measuring means with a scanning means, wherein the scanning means is shielded from electric disturbing influences. The scanning means is thereby fastened in a housing in an electrically insulated manner and is connected to the mass potential of an evaluation unit. The housing is also in electric contact with the drive unit so that the interference signals outputted by the drive unit do not negatively affect the measuring values.

A drawback is, however, that magnetically induced interferences are not shielded off and measuring errors are still caused in the sensor unit, in particular with a magnet-based angle measuring means. The means for shielding the angle measuring means also has a very complex structure and comprises a great number of components.

SUMMARY

An aspect of the present invention is to provide an angular displacement measuring system for detecting a rotational movement of a drive shaft that provides for an exact and interference-free measuring, which has a simple structure, and which is simple to assemble.

In an embodiment, the present invention provides a magnet-based angular displacement measuring system for measuring a rotational movement of a driveshaft. The magnet-based angular displacement measuring system includes a drive shaft comprising a free end, the free end comprising a coaxial recess so as to form a hollow shaft section, an exciter unit rotationally coupled to the free end of the drive shaft, and a stationary sensor unit configured to functionally cooperate with the exciter unit to measure the rotational movement of the drive shaft.

BRIEF DESCRIPTION OF THE DRAWINGS

The present invention is described in greater detail below on the basis of embodiments and of the drawings in which.

DETAILED DESCRIPTION

Figure 1:
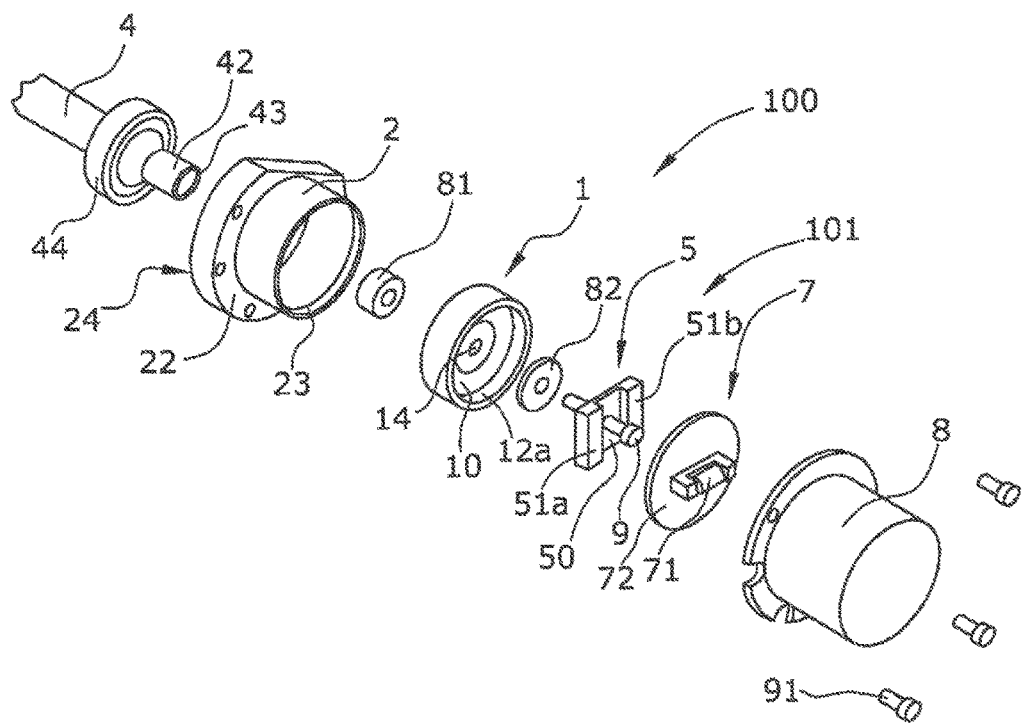
FIG. 1 schematically shows a perspective view of a first embodiment of an angular displacement measuring system according to the present invention, wherein the components are shown in an exploded view.

According to the present invention, the drive shaft has a coaxial recess or indentation in the region of the free end so that a hollow shaft section is formed in this region of the drive shaft. In the present instance, the drive shaft may be a separately formed shaft part, a transmission shaft, or the shaft of an electric motor or of an electric brake. The drive shaft may at least partly be formed as a solid shaft. By providing the coaxial recess, a magnetic field induced in the drive shaft in the region of the free end can be passed into a radial outer region of the drive shaft and be concentrated there, for example, for discharge. The recess makes it possible to discharge a magnetic field generated in the drive shaft radially outward. A hollow space radially enclosed by the hollow shaft section can thereby almost be magnetically insulated. This region is therefore particularly suited for coupling a measuring unit to the drive shaft.

In an embodiment of the present invention, the recess in the free end of the drive shaft can, for example, have a frustoconical shape so that the material ring remaining in the region of the hollow shaft section and protruding axially from the solid shaft tapers conically or converges to a point in the direction of the free end. This frustoconical shape allows for a relatively uniform, radially outward directed discharge of a magnetic field generated in the drive shaft. Depending on the requirements, the recess may alternatively also be hemispheric or may have any other shape.

In an embodiment of the present invention, the exciter unit can, for example, be coupled or fastened to the drive shaft using a fastening device extending through the recess, for example, a magnetically not conductive screw or shaft. The fastening device of the exciter unit may advantageously be arranged in the region of the recess immediately on the drive shaft therefore. No additional shaft is thereby required for the measuring unit. A bore may be formed in the drive shaft at the bottom of the recess for placing the fastening unit, which can, for example, be designed as an axial screw, the bore extending, for example, coaxially with the drive shaft and having a thread corresponding to the screw. The exciter unit can thereby be mounted to the free end of the drive shaft in a relatively simple manner. The fastening device may alternatively be formed by a screw adapted to be placed radially in the drive shaft, in particular a grub screw. It may additionally or alternatively be provided to adhesively bond the exciter unit to the drive shaft. The fastening device per se can, for example, be made of a material that is not or is only slightly conductive. The fastening device can, for example, be made of titanium or brass so that it is possible to prevent the transfer of the magnetic field induced in the drive shaft or a shaft section towards the exciter unit via the fastening device.

In an embodiment of the present invention, a radial air gap can, for example, be formed in the region of the hollow shaft section between the drive shaft and the fastening device. The diameter of the recess may be of such a size that the fastening device can extend in a contactless manner through the recess or the hollow shaft section at least in the region of the free end. A second axial end face of the drive shaft can, for example, be formed at the bottom of the recess, where the fastening device is in contact with the drive shaft and where it is fastened to the drive shaft. In an embodiment, the fastening device can, for example, be surrounded by a spacer or a pacer sleeve at least in the region of the hollow shaft section, which spacer is made of a magnetically not conductive material. The screw can thus be magnetically insulated in a particularly effective manner so that it is possible to prevent magnetic induction into the screw in the region of the hollow shaft section. Providing the spacer sleeve may in particular have the effect that the magnetic field is scattered rather widely when transferred between two conductors, thereby preventing a local magnetic saturation of the receiving material.

In an embodiment of the present invention, a first shielding body can, for example, be provided comprising an annular disc coaxial to the drive shaft and which can, for example, be arranged axially between the exciter unit and the drive shaft, and a first axial section extending circumferentially on the radial outer side of the annular disc. The annular disc can, for example, have a coaxial opening through which at least the fastening device extends. The diameter of this opening can, for example, be only slightly larger than the diameter of the fastening device. The opening may also serve to center the annular disc with respect to the fastening device. A part of the drive shaft may also extend through this opening. The first axial section may protrude from the annular disc from one side. The first axial section may alternatively protrude from the annular disc on both sides, in particular in equal portions. The first axial section may thereby at least partly surround the drive shaft in the region of the hollow shaft section. This allows for a relatively space-saving structure of the angular displacement measuring system. The first axial section may be designed as a cylindrical section so that a very large circumferential surface is formed. The first shielding body can, for example, be magnetically conductive or can, for example, have a relatively high magnetic permeability so that a magnetic field induced, for example, in the region of the opening of the annular disc, can be transferred radially outward by the annular disc and be transferred further by the first axial section arranged on the radial outer side of the annular disc or be transferred to an adjacent component. The first shielding body can, for example, be made of a so-called "mu-metal", which is a nickel iron alloy. The first shielding body can alternatively be made of steel. It is thus possible to dissipate a magnetic field generated in the drive shaft and thus to effectively shield the measuring unit of the angular displacement measuring system.

In an embodiment of the present invention, the first shielding body can, for example, be connected to the drive shaft for rotation therewith. For this purpose, the first shielding body may contact the free end of the hollow shaft section and/or a spacer by an axial end face of the annular disc and may be fastened to the drive shaft, for example, by the fastening device of the exciter unit. A magnetic field generated in the drive shaft and present in the hollow shaft section can thereby be transferred into the annular disc directly via the end face. The magnetic field induced in the annular disc can be transferred radially outward into the first axial section so as to shield the measuring unit. This provides for a particularly effective and relatively space-saving shielding of the measuring unit.

It has been shown that a defined distance between the first shielding body and the drive shaft is suited for a uniform and constant transmission of a magnetic field from the drive shaft to the first shielding body. A first spacer can therefore, for example, be arranged between the first shielding body and the drive shaft. The first spacer can, for example, be made of a material that is not or is only slightly magnetically conductive. The first spacer can, for example, be suited to enclose the free end of the drive shaft both axially and radially. The first spacer is in particular configured as a sleeve adapted to be set on the free end. The first shielding body can thereby be arranged and fixed with respect to the drive shaft at a defined distance both in the axial and the radial direction. For fastening the first spacer, the first spacer can, for example, have an opening through which the fastening device extends so that the first spacer can be pretensioned in the direction of the drive shaft.

A second spacer may be arranged between the shielding body and the exciter unit in order to avoid a transmission of a magnetic field from the first shielding body to the exciter unit. The second spacer can, for example, be made of a material having no or only a little magnetic conductivity. The second spacer may be a washer which may be placed in a recess in the first shielding body for fixation.

In an embodiment of the present invention, the first shielding body can, for example, have a second axial section by which the first shielding body can radially abut on the drive shaft and/or the spacer. The first shielding body may in particular be set or sleeved on the free end of the drive shaft and/or the spacer by the second axial section. This allows for a very large transfer surface for the transfer of a magnetic field from the drive shaft to the first shielding body. The transfer of a magnetic field may thus be effected at the end face and/or radially at the drive shaft. A relatively simple and precise centering is thereby possible.

In an embodiment of the present invention, the first shielding body can, for example, be spaced at a defined axial distance from the free end of the hollow shaft section by at least an axial end face of the annular disc that is arranged opposite the free end of the drive shaft. The first shielding body may also be radially spaced from the drive shaft. An axial and/or radial air gap may thereby be formed between the first shielding body and the drive shaft so that the first shielding body may be stationary with respect to the drive shaft. For transferring a magnetic field from the drive shaft to the first shielding body, the diameter of the inner opening of the annular disc can, for example, be smaller than the inner diameter of the hollow shaft section of the drive shaft at the free end. A magnetic field prevailing at the free end of the drive shaft in the hollow shaft section can thereby be transferred or induced axially into the annular disc to a limited extent via the air gap formed between the drive shaft and the first shielding body. The magnetic field can thus in particular be transferred uniformly and continuously without a magnetic supersaturation occurring in the annular disc. The air gap may also be replaced with or realized as a magnetically non-conductive spacer in an alternative embodiment. For an effective diversion of the magnetic field, the annular disc and the axial section of the first shielding body may also be formed with relatively little material or thin. An effective shielding and a relatively light weight of the angular displacement measuring system are thereby possible so that manufacturing costs are also consequently reduced.

In an embodiment of the present invention, a second shielding body having an axial cylindrical section which radially encloses at least the first axial section of the first shielding body can, for example be provided, a defined air gap being formed between the first radial section and the axial cylindrical section. The first shielding body can, for example, be magnetically conductive and be made of steel or the mu-metal. The radial distance between the first shielding body and the second shielding body may be constant for the axial length of the cylinder. It is thus possible to effect a large-surface and a uniform transfer of a magnetic field. During assembly, the second shielding body can further be sleeved over the first shielding body in a relatively simple manner. The second shielding body may be configured to be stationary and in particular as an outer housing of at least the measuring unit. A magnetic field generated in the rotating components of the angular displacement measuring system can thereby be transferred to at least one stationary component, especially the second shielding body, at a transfer location. The surface for shielding can thereby be enlarged without requiring additional rotating components and the resulting additional weight at the drive shaft. An effective shielding from an externally generated magnetic field can also be provided.

The first shielding body and/or the second shielding body may at least comprise an axial bearing section on which a bearing of the drive shaft abuts. The first shielding body and/or the second shielding body can, for example, comprise a shoulder on which a shaft bearing of the drive shaft abuts. An exact alignment of the angular displacement measuring system of the measuring unit is thereby possible with respect to the drive shaft, as well as a space-saving structure.

The first shielding body and/or the second shielding body may comprise at least one shoulder to which the sensor unit and/or a housing are fastened. The first shielding body and/or the second shielding body can, for example, be formed with a flange having a screw hole pattern, to which flange the housing with a corresponding counter-flange and a corresponding screw hole pattern is fastened using screws. The respective shielding body may itself be adapted, for example, to be fixed to a machine thereby or via a further shoulder. The first shielding body may also be fastened to the second shielding body at the shoulder. The first shielding body and/or the second shielding body may also be provided with a shoulder or web for fastening the sensor unit. The second shielding body in particular has a shoulder at which a sensor body can be inserted and fastened. It is thereby possible to align the components of the angular displacement measuring system with each other so that an air gap formed between rotating and stationary components can be relatively small, while the angular displacement measuring system may have of a relatively compact structure.

In an embodiment of the present invention, a housing can, for example, be provided which at least partly surrounds the angular displacement measuring system. The measuring unit, the first shielding body and/or the second shielding body may in particular be surrounded axially and/or radially by the housing. The housing can, for example, be made of steel. A particularly effective shielding of the measuring unit or of the angular displacement measuring system from interferences can thus be achieved which occur on the outside of the angular displacement measuring system and which could have negative effects on the angular displacement measuring system.

In an embodiment of the present invention, the housing can, for example, be adapted to be set on the first shielding body and/or on the second shielding body. The housing can, for example, be designed as a pot which is adapted to axially set on the angular displacement measuring system, in particular on the measuring unit. An effective shielding and a relatively simple assembly of the angular displacement measuring system are thereby possible.

The exciter unit may comprise a magnet carrier with at least two magnets fixed on the magnet carrier. This provides for a relatively simple and economic manufacture and assembly of the exciter unit. The magnet carrier is magnetically conductive and is arranged directly opposite the sensor so that a double shielding exists that exactly defines a magnetic field system. The magnetic conditions at the sensor, in particular a Wiegand sensor, can thereby be secured and a multi-turn functionality of the sensor becomes possible.

In an embodiment of the present invention, the drive shaft can, for example, be coaxially connected to a second shaft at a shaft end portion which is averted from or opposite to the free end at which the exciter unit is arranged and which is in particular a second free end. The drive shaft may thereby be made of a material that is not or that is only slightly magnetically conductive, such as titanium or brass, while the second shaft may be made of steel. An additional shielding of the measuring unit from magnetic interferences can thereby be achieved.

The present invention will be described in detail below under reference to three embodiments and to the accompanying drawings.

FIGS. 1 to 4 respectively show an angular displacement measuring system 100 which provides for a direct assembly or a direct coupling of a measuring unit 101 to a drive shaft 4, wherein the measuring unit 101 comprises an exciter unit 5 and a sensor unit 7. The angular displacement measuring system 100 is in particular arranged at an axial end of the drive shaft 4 so that an additional shaft for the measuring unit 101 is not required.

The drive shaft 4 typically is a solid shaft made of steel which is suited to be at least partially magnetized. The drive shaft 4 can in particular be magnetized in use by the electric motor (not shown in the drawings), or by a magnetic brake in contact with the drive shaft 4 (which brake is also not shown in the drawings). It is necessary to shield the measuring unit 101 from such magnetic fields to avoid measuring errors caused thereby, in particular in magnet-based measuring units 101 which are in direct contact with the drive shaft 4. Such shielding is presently in particular effected by a geometric design of the magnetically conductive components 1, 2, 4, 8 of the angular displacement measuring system 100 so that the magnetic fields interfering with a measurement are dissipated around the measuring unit 101.

Figure 2:
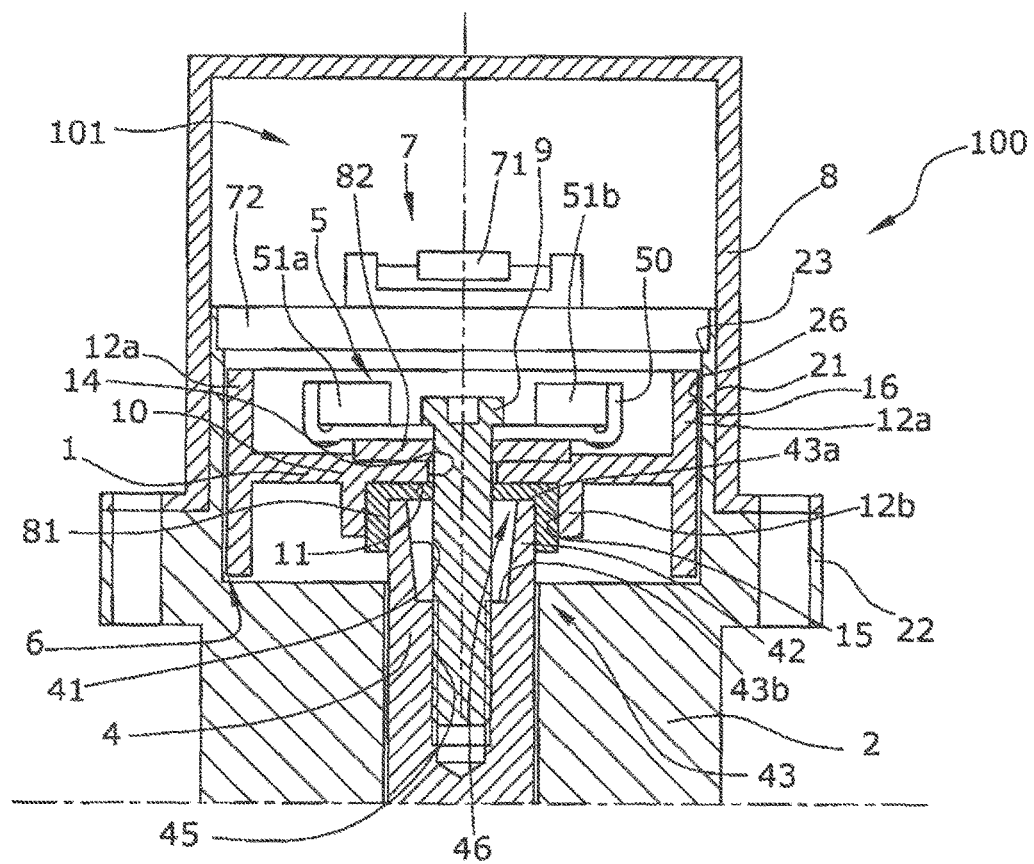
FIG. 2 schematically illustrates a detail of the first embodiment in sectional side view.

As shown in FIGS. 1 and 2, the drive shaft 4 has a hollow shaft section 42 at a free end 43 thereof, which hollow shaft section 42 tapers conically toward the free end 43 of the drive shaft 4. A cylindrical or frustoconical recess 41 is thereby formed in the drive shaft 4 at the free end 43, while a narrow circumferential end face 43a exists at an axial front face of the drive shaft 4. The recess 41 can, for example, be made using a lathe tool or also by a coaxial bore. A second end face 43b of the drive shaft 4 is formed at the bottom of the recess 41, which second end face 43b is surrounded by the hollow shaft section 42 and is penetrated by a bore 45 coaxial to the drive shaft 4. The bore 45 is provided with a thread in engagement with a fastening device 9, which is shown as a screw 9. The screw 9 is made of a material that is not or that is only slightly magnetically conductive, for example, a titanium aluminum vanadium alloy, so that, at the free end 43 of the drive shaft 4, a magnetic field induced in the drive shaft 4 is not transferred via the screw 9, but is merely transferred into the outer region or into the hollow shaft section 42. The conical design of the hollow shaft section 42 effects a concentration of the magnetic field transferred into the hollow shaft section 42.

In order to dissipate a magnetic field induced in the hollow shaft section 42 to the outside or around the measuring unit 101, a first shielding body 1 is provided which has an annular disc 10 and a first axial section 12a circumferentially extending on the radial outer side of the annular disc 10. As can be seen in FIG. 2, the first shielding body 1 is set axially on the drive shaft 4 or on a first spacer 81 via a second axial section 12b and is connected to the drive shaft 4 via said second section.

The first spacer 81 is designed as a sleeve coaxially aligned with the drive shaft 4 and having a cover, the spacer being fittingly sleeved axially on the free end 43 of the drive shaft 4. The cover of the first spacer 81 is provided with an opening through which the screw 9 extends. The first shielding body 1 is fittingly sleeved on the first spacer 81 so that the first shielding body 1 and the first spacer 81 can be fixed to the drive shaft 4 via the screw 9. The arrangement of the first spacer 81 between the drive shaft 4 and the first shielding body 1 allows the arrangement of the first shielding body 1 at a defined axial and radial distance from the drive shaft 4. An end face 11, as well as a transfer surface 15 formed on the radial inner side of the second axial section 12b, are in particular arranged at a constant distance from the drive shaft 4. This allows for a uniform and continuous transfer of a magnetic field from the drive shaft 4 to the first shielding body 1.

It has been shown that it is possible to optimize a dissipation of a magnetic field by spacing the first shielding body 1 from the drive shaft 4 and thus a restriction of the magnetic transfer from the drive shaft 4 to the first shielding body 1. An air gap 46 or a magnetically non-conductive spacer may serve as the restriction between the first shielding body 1 and the drive shaft 4. For this reason, the first spacer 81 can, for example, be made of a material that has no or only little magnetic conductivity, for example, aluminum. It is thereby possible to constantly transfer a magnetic field for a longer period from the drive shaft 4 to the first shielding body 1 without experiencing an increased magnetic concentration or even a magnetic saturation in the end face 11, in the transfer surface 15, or in the transition material of the first shielding body 1.

The annular disc 10 of the first shielding body 1 has a coaxial opening 14 through which the screw 9 extends. The first shielding body 1 can thus be pretensioned onto the axial end face 45a of the drive shaft 4. The first axial section 12a is formed on the radial outer side of the annular disc 10, in particular as a coaxial cylindrical section. The first axial section 12a extends from the annular disc 10 on either side towards and away from the drive shaft 4. The first shielding body 1 is made of a magnetically conductive material, for example, iron or steel. A magnetic field concentrated in the flanks of the hollow shaft section 42 can thus be transferred into the annular disc 10 and into the second axial section 12b of the first shielding body 1 and can be dissipated radially outward into the first axial section 12a via the first shielding body 1. The first axial section 12a of the first shielding body 1 is radially surrounded by a stationary second shielding body 2 in the assembled state.

The second shielding body 2 comprises a flange 22 from which an axial cylindrical flange 21 extends. The axial cylindrical flange 21 of the second shielding body 2 surrounds the first axial section 12a of the first shielding body 1 with a smaller radial distance 6 so that the first shielding body 1 is freely rotatable in the second shielding body 2. An outer radial transfer surface 16 of the first axial section 12a and an inner radial transfer surface 26 of the axial cylindrical section 21 are thus arranged opposite each other with a small air gap between them. A magnetic field can thereby be transferred from the first shielding body 1 to the second shielding body 2 and be transmitted further. In the present case, the second shielding body 2 has an axial bearing section 24 which is in contact with a bearing 44 of the drive shaft 4. This allows for an exact alignment of the measuring unit 101 with respect to the drive shaft 4.

The first axial section 12a radially surrounds a space in which the exciter unit 5 is arranged at least partly. The exciter unit 5 includes a magnet carrier 50 at which two permanent magnets 51a, 51b are fastened. The exciter unit 5 is connected for rotation with the drive shaft 4 via the screw 9, so that, in operation, the permanent magnets 51a, 51b build a rotatory magnetic field corresponding to the rotation of the drive shaft 4, which magnetic field is detected by the sensor unit 7. A magnetically non-conductive second spacer 82 is provided between the first shielding body 1 and the exciter unit 5 in order to avoid a transmission of a magnetic field from the first shielding body 1 to the magnet carrier 50. In the present instance, the second spacer 82 is designed as a washer set into an axial recess in the annular disc 10 so that a slipping or shifting of the washer 82, as well as of the screw 9, is prevented with respect to the annular disc 10.

The screw 9 thus extends through the magnet carrier 50, the second spacer 82, the first shielding body 1, and the first spacer 81, into the drive shaft 4, so that the above-mentioned components of the angular displacement measuring system 100 are fixed to the drive shaft 4. The screw 9 can, for example, here be connected coaxially with the drive shaft 4 and be arranged in the recess 41 in a contactless manner with respect to the radially inner side walls of the hollow shaft section 42.

The sensor unit 7 is stationary and in particular includes a sensor 71, for example, a Hall sensor and/or a Wiegand sensor, fastened to a sensor carrier 72. In an embodiment, the sensor 71 is suited to detect each rotation of the drive shaft 4. The sensor unit 7 may further include processing electronics (not shown in the drawings). The sensor carrier 72 is designed as a round disc which, in the mounted state, rests on a shoulder 23 of the second shielding body 2. The sensor carrier 72 thus forms a cover for the exciter unit 5 arranged inside the first axial section 12a of the first shielding body 1.

A stationary housing 8 at least partly encloses both the first shielding body 1 and the second shielding body 2. The housing 8 may here be sleeved in a simple manner on the axial cylindrical section 21 of the second shielding body 2 and be fastened to the flange 22 of the second shielding body 2 using screws 91. The housing 8 may be made of steel so that a magnetic field transferred from the second shielding body 2 into the housing 8 can be dissipated to the outside.

It should be clear that at least the drive shaft 4, the second shielding body 2, the first spacer 81, the first shielding body 1, the second spacer 82, the screw 9, the sensor carrier 72, and the housing 8, have a common longitudinal axis. It is thus possible to integrate a high-resolution magnetic multi-turn sensor unit 7 having a magnetic shielding in a motor.

Figure 3:
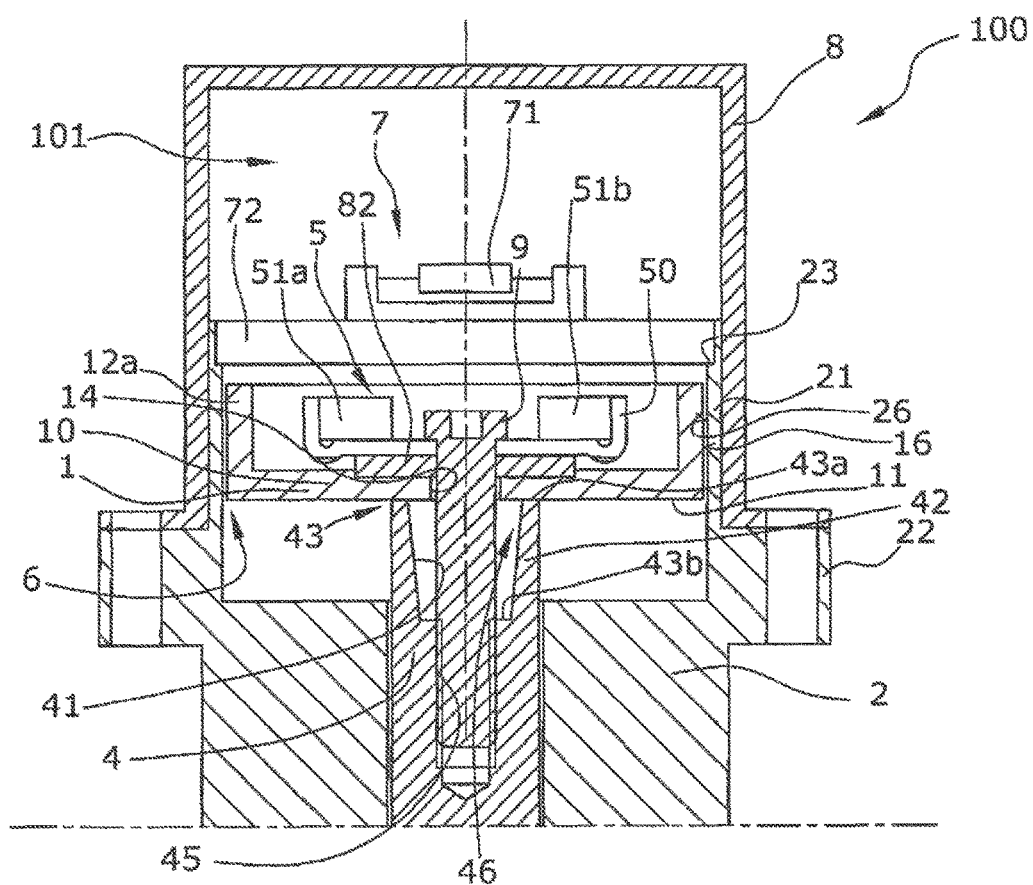
FIG. 3 schematically illustrates a detail of a second embodiment of an angular displacement measuring system according to the present invention in sectional side view.

FIG. 3 shows an alternative embodiment of the present invention which for the most part corresponds to the embodiment illustrated in FIGS. 1 and 2 except, for example, the design and the arrangement of the first shielding body 1 with respect to the drive shaft 4.

In the embodiment of the angular displacement measuring system 100 illustrated in FIG. 3, a drive shaft 4 with a hollow shaft section 42 formed at a free end 43 is again provided. A first shielding body 1 directly contacts an axial end face 43a of the drive shaft 4 by an end face 11 of an annular disc 10. A first spacer 81 is not provided. A magnetic field prevailing in the drive shaft 4 can thus be transferred directly to the first shielding body 1. A circumferentially extending first axial section 12a is formed on the radial outer side of the annular disc 10 to transmit the magnetic field from the first shielding body 1 to a second shielding body 2, which first axial section 12a is cylindrical in shape and extends from one side of the annular disc 10 away from the drive shaft 4. An axial cylindrical section 21 of the second shielding body 2 is again arranged opposite the first axial section 12a and spaced therefrom. An effective shielding of the measuring unit 101 can thereby be realized.

Figure 4:
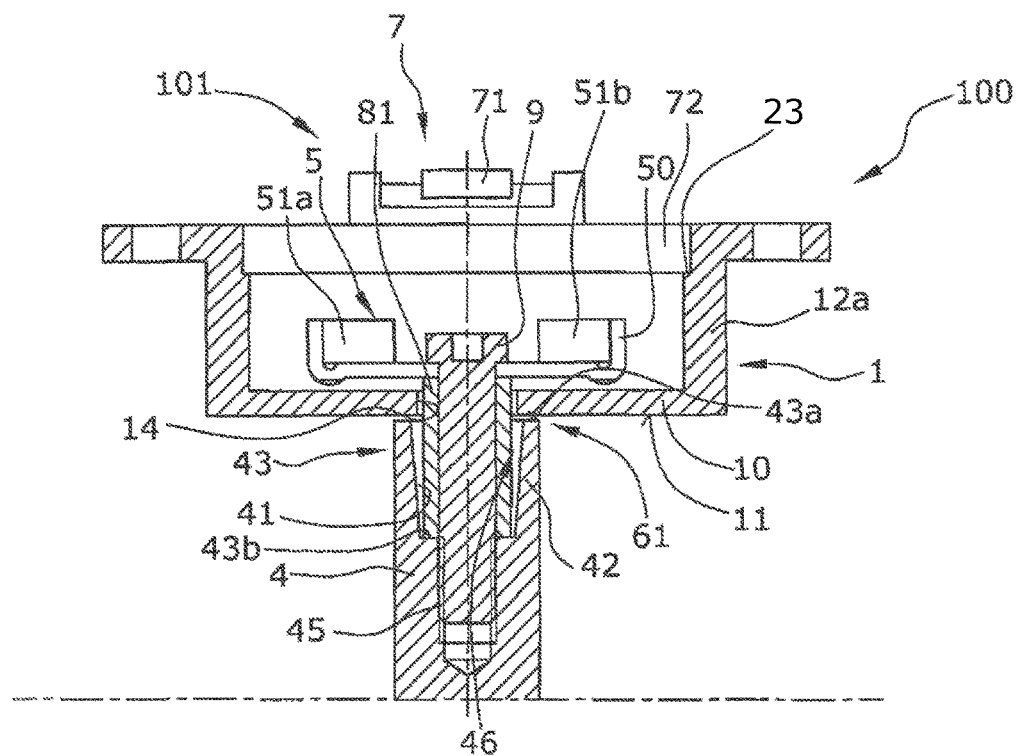
FIG. 4 schematically illustrates a detail of a third embodiment of an angular displacement measuring system according to the present invention in sectional side view.

FIG. 4 illustrates an alternative embodiment of the present invention which again corresponds for the most part to the embodiment illustrated in FIGS. 1 and 2 except, for example, the design and the arrangement of the first shielding body 1 with respect to the drive shaft 4.

The embodiment of the angular displacement measuring system 100 illustrated in FIG. 4 is again provided with a drive shaft 4 having a frustoconical hollow shaft section 42 with a recess 41 at a free end 43. A first spacer 81 is placed in the recess 41, which first spacer 81 is connected for rotation with the drive shaft 4 and whose axial length is clearly greater than the axial length of the recess 41. The first spacer 81 thus protrudes from the free end 43 of the drive shaft 4. The first spacer 81 can, for example be made of a material having only little magnetic conductivity, for example, aluminum. A fastening device 9 in the form of a screw extends through the first spacer 81. The screw 9 is also made of a material that is not or that is only slightly magnetically conductive so that a magnetic field induced in the drive shaft 4 is not transmitted via the first spacer 81 and/or the screw 9, but is concentrated in the flanks of the hollow shaft section 42 arranged on the radial outer side.

The screw 9 is used to pretension a magnet carrier 50 of an exciter unit 5 on the drive shaft 4 at the free end of the first spacer 81 protruding from the hollow shaft section 42. Two permanent magnets 51a, 51b are fastened to the magnet carrier 50, which in operation build a magnetic field corresponding to the rotation of the drive shaft 4, which field can be detected by a sensor 71 of a sensor unit 7. The sensor 71 is surrounded by a housing 8 (not shown in FIG. 4).

A first shielding body 1 is arranged with an end face 11 of an annular disc 10 at a defined distance from an axial end face 43a of the drive shaft 4 so that an axial air gap 61 is arranged between the first shielding body 1 and the drive shaft 4. In the present instance, the first shielding body 1 is designed as a stationary component of the angular displacement measuring system 100. The first shielding body 1 may be of a two-part structure so that the first shielding body 1 has two halves adapted to be plugged or set radially into each other. The first shielding body 1 can also be fastened to the housing 8 (not shown in FIG. 4) via a flange. The screw 9 and the first spacer 81 extend through a coaxial opening 14 in the annular disc 10. The diameter of this coaxial opening 14 is smaller than the diameter of the radial inner flanks of the hollow shaft section 42. A circumferentially extending, axial section 12 is formed on the radial outer side of the annular disc 10, which axial section 12 is cylindrical in shape and extends from one side of the annular disc 10 away from the drive shaft 4. The first shielding body 1 is stationary and is not connected to the drive shaft 4. The first shielding body 1 is made of a magnetically conductive material, for example, iron or steel. A magnetic field concentrated in the flanks of the hollow shaft section 42 can thus be transferred into the annular disc 10 via the axial air gap 61 and can finally be directed radially outward into the first axial section 12a around the exciter unit 5 and the sensor unit 7. The measuring unit 101 can thereby be effectively shielded from a magnetic field induced in the drive shaft 4.

The present invention is not limited to embodiments described herein; reference should be had to the appended claims.

REFERENCE NUMERALS 100 angular displacement measuring system
101 measuring unit
1 first shielding body
10 annular disc
11 end face (of the annular disc)
12a first axial section
12b second axial section
14 coaxial opening
15 transfer surface
16 outer radial transfer surface
2 second shielding body
21 axial cylindrical flange
22 flange
23 shoulder
24 axial bearing section
26 inner radial transfer surface
4 drive shaft
41 recess
42 hollow shaft section
43 free end 43a end face/axial end face
43b second end face
44 bearing
45 bore
46 air gap
5 exciter unit
50 magnet carrier
51a permanent magnet
51b permanent magnet
6 radial air gap
61 axial air gap
7 sensor unit
71 sensor
72 sensor carrier
8 housing
81 first spacer
82 second spacer/washer
9 fastening device/screw
91 screw

What is claimed is:

1. A magnet-based angular displacement measuring system for measuring a rotational movement of a drive shaft, the magnet-based angular displacement measuring system comprising:
a drive shaft comprising a free end, the free end comprising a coaxial recess so as to form a hollow shaft section;
a fastening device configured to extend through the coaxial recess,
an exciter unit rotationally coupled to and fixed on the free end of the drive shaft by the fastening device extending through the coaxial recess;
a stationary sensor unit configured to functionally cooperate with the exciter unit to measure the rotational movement of the drive shaft; and
a radial air gap formed in a region of the hollow shaft section between the drive shaft and the fastening device.

2. The magnet-based angular displacement measuring system as recited in claim 1, wherein the coaxial recess has a frustoconical shape.

3. The magnet-based angular displacement measuring system as recited in claim 1, further comprising:
a first shielding body comprising an annular disc and a first axial section which extends circumferentially on a radial outer side of the annular disc, the annular disc being arranged coaxial to the drive shaft between the exciter unit and the drive shaft.

4. The magnet-based angular displacement measuring system as recited in claim 3, wherein the first shielding body is connected to the drive shaft and is configured to rotate therewith.

5. The magnet-based angular displacement measuring system as recited in claim 3, further comprising:
a first spacer arranged between the first shielding body and the drive shaft.

6. The magnet-based angular displacement measuring system as recited in claim 5, wherein the first shielding body further comprises a second axial section via which the first shielding body radially contacts at least one of the drive shaft and the first spacer.

7. The magnet-based angular displacement measuring system as recited in claim 3, further comprising:
a second spacer arranged between the first shielding body and the exciter unit.

8. The magnet-based angular displacement measuring system as recited in claim 3, wherein,
the annular disc of the first shielding body comprises an axial end face, and
the first shielding body is arranged, via the axial end face, at a defined distance from the free end of the hollow shaft section.

9. The magnet-based angular displacement measuring system as recited in claim 3, further comprising:
a second shielding body comprising an axial cylindrical section which is configured to radially surround at least the first axial section of the first shielding body,
wherein,
a defined air gap is formed between the first axial section and the second shielding body.

10. The magnet-based angular displacement measuring system as recited in claim 9, wherein,
the drive shaft further comprises a bearing, and
at least one of the first shielding body and the second shielding body comprises an axial bearing section on which the bearing of the drive shaft is configured to abut.

11. The magnet-based angular displacement measuring system as recited in claim 9, further comprising:
a sensor unit; and
a housing,
wherein,
at least one of the first shielding body and the second shielding body comprises at least one shoulder which is configured to have at least one of the sensor unit and the housing be fixed thereto.

12. The magnet-based angular displacement measuring system as recited in claim 11, wherein the housing is configured to at least partly surround the angular displacement measuring system.

13. The magnet-based angular displacement measuring system as recited in claim 12, wherein the housing is configured to be set axially on at least one of the first shielding body and the second shielding body.

14. The magnet-based angular displacement measuring system as recited in claim 1, wherein the exciter unit comprises a magnet carrier which comprises at least one magnet fixed thereon.

* * * * *